(12) United States Patent
Agarwal et al.

(10) Patent No.: US 11,599,415 B2
(45) Date of Patent: *Mar. 7, 2023

(54) MEMORY TIERING TECHNIQUES IN COMPUTING SYSTEMS

(71) Applicant: Microsoft Technology Licensing, LLC, Redmond, WA (US)

(72) Inventors: Ishwar Agarwal, Redmond, WA (US); George Zacharias Chrysos, Portland, OR (US); Oscar Rosell Martinez, Barcelona (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/371,422

(22) Filed: Jul. 9, 2021

(65) Prior Publication Data

US 2023/0020131 A1    Jan. 19, 2023

(51) Int. Cl.
*H03M 13/00* (2006.01)
*G06F 11/10* (2006.01)
(Continued)

(52) U.S. Cl.
CPC ........ *G06F 11/1068* (2013.01); *G06F 3/0604* (2013.01); *G06F 3/067* (2013.01);
(Continued)

(58) Field of Classification Search
CPC ............. G06F 11/1068; G06F 11/1435; G06F 12/0811; G06F 3/0604; G06F 3/0619; G06F 3/0659; G06F 3/067; G06F 3/0679
See application file for complete search history.

(56) References Cited

U.S. PATENT DOCUMENTS

| | | | |
|---|---|---|---|
| 7,454,572 B2 | 11/2008 | Chu | |
| 10,691,593 B1 * | 6/2020 | Korzh | G06N 3/0454 |

(Continued)

FOREIGN PATENT DOCUMENTS

| | | |
|---|---|---|
| EP | 3486785 A1 | 5/2019 |
| EP | 3783490 A1 | 2/2021 |

(Continued)

OTHER PUBLICATIONS

"Notice of Allowance Issued in U.S. Appl. No. 17/328,891", dated Feb. 11, 2022, 12 Pages.

(Continued)

*Primary Examiner* — Albert Decady
*Assistant Examiner* — Enamul M Kabir

(57) ABSTRACT

Techniques of memory tiering in computing devices are disclosed herein. One example technique includes retrieving, from a first tier in a first memory, data from a data portion and metadata from a metadata portion of the first tier upon receiving a request to read data corresponding to a system memory section. The method can then include analyzing the data location information to determine whether the first tier currently contains data corresponding to the system memory section in the received request. In response to determining that the first tier currently contains data corresponding to the system memory section in the received request, transmitting the retrieved data from the data portion of the first memory to the processor in response to the received request. Otherwise, the method can include identifying a memory location in the first or second memory that contains data corresponding to the system memory section and retrieving the data from the identified memory location.

20 Claims, 7 Drawing Sheets

(51) Int. Cl.
  *G06F 11/14* (2006.01)
  *G06F 3/06* (2006.01)
  *G06F 12/0811* (2016.01)
(52) U.S. Cl.
  CPC .......... *G06F 3/0619* (2013.01); *G06F 3/0659* (2013.01); *G06F 3/0679* (2013.01); *G06F 11/1435* (2013.01); *G06F 12/0811* (2013.01)

(56) References Cited

U.S. PATENT DOCUMENTS

| | | | |
|---|---|---|---|
| 2014/0040550 A1* | 2/2014 | Nale ................... | G06F 13/1694 711/118 |
| 2014/0181615 A1 | 6/2014 | Kwok | |
| 2017/0091122 A1 | 3/2017 | Gove | |
| 2017/0177482 A1* | 6/2017 | Greenspan .......... | G06F 12/0815 |
| 2017/0286210 A1 | 10/2017 | Yigzaw et al. | |
| 2017/0286298 A1* | 10/2017 | Geetha ................ | G06F 12/0811 |
| 2018/0060235 A1 | 3/2018 | Yap et al. | |
| 2018/0067684 A1 | 3/2018 | Benisty et al. | |
| 2018/0285267 A1* | 10/2018 | Sasanka .............. | G06F 12/0811 |
| 2019/0034337 A1* | 1/2019 | Arafa ...................... | G06F 12/08 |
| 2019/0042425 A1 | 2/2019 | Shifer | |
| 2019/0303238 A1* | 10/2019 | Marietta ............. | G06F 12/0607 |
| 2020/0278804 A1 | 9/2020 | Guim Bernat et al. | |
| 2020/0356482 A1* | 11/2020 | Geetha ................ | G06F 12/0831 |
| 2021/0374000 A1 | 12/2021 | Chhabra et al. | |

FOREIGN PATENT DOCUMENTS

| | | |
|---|---|---|
| JP | 2017162492 A | 9/2017 |
| WO | 2013048485 A1 | 4/2013 |

OTHER PUBLICATIONS

Chou, et al., "CAMEO: A Two-Level Memory Organization with Capacity of Main Memory and Flexibility of Hardware-Managed Cache", In Proceedings of the 47th Annual IEEE/ACM International Symposium on Microarchitecture, Dec. 2014, 12 pages.

Do, Tam, "CXL™ Use-cases Driving the Need For Low Latency Performance Retimers", https://www.microchip.com/en-us/about/blog/learning-center/cxl-use-cases-driving-the-need-for-low-latency-performance-reti, Dec. 15, 2020, 3 Pages.

Guo, et al., "SELF: A High Performance and Bandwidth Efficient Approach to Exploiting Die-stacked DRAM as Part of Memory", In Proceedings of the 25th International Symposium on Modeling, Analysis, and Simulation of Computer and Telecommunication Systems, Sep. 20, 2017, 11 Pages.

Kokolis, et al., "PageSeer: Using Page Walks to Trigger Page Swaps in Hybrid Memory Systems", In Proceedings of the IEEE International Symposium on High Perfomnance Computer Architecture, Feb. 16, 2019, 13 Pages.

Meswani, et al., "Heterogeneous Memory Architectures: A HW/SW Approach for Mixing Die-stacked and Off-package Memories", Heterogeneous Memory Architectures: A HW/SW Approach for Mixing Die-stacked and Off-package Memories, Feb. 7, 2015, pp. 126-136.

"International Search Report & Written Opinion issued in PCT Application No. PCT/US22/017789", dated Jun. 7, 2022, 11 Pages.

"International Search Report & Written Opinion issued in PCT Application No. PCT/US22/031862", dated Sep. 21, 2022, 12 Pages.

Ryoo, et al., "Poster: SILC-FM: Subblocked InterLeaved Cache-Like Flat Memory Organization", In Proceedings of the International Conference on Parallel Architecture and Compilation Techniques, Sep. 11, 2016, pp. 435-437.

Sim, et al., "Transparent Hardware Management of Stacked DRAM as Part of Memory", In Proceedings of the 47th Annual IEEE/ACM International Symposium on Microarchitecture, Dec. 13, 2014, pp. 13-24.

Uppal, et al., "Towards Workload-Aware Page Cache Replacement Policies for Hybrid Memories", In Proceedings of the International Symposium on Memory Systems, Oct. 5, 2015, 14 Pages.

Yu, et al., "Using Locality-Enhanced Distributed Memory Cache to Accelerate Applications on High Performance Computers". In Proceedings of 3rd International Conference on Big Data Security on Cloud, May 26, 2017, pp. 160-166.

\* cited by examiner

MEMORY TIERING TECHNIQUES IN COMPUTING SYSTEMS

BACKGROUND

In computing, memory typically refers to a computing component that is used to store data for immediate access by a central processing unit (CPU) in a computer or other types of computing devices. In addition to memory, a computer can also include one or more computer storage devices (e.g., a hard disk drive or HDD) that persistently store data on the computer. In operation, data, such as instructions of an application can first be loaded from a computer storage device into memory. The CPU can then execute the instructions of the application loaded in the memory to provide computing services, such as word processing, online meeting, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain computing devices can include a CPU configured to access different types of memory. For example, a computing device can include a first type of memory that is a high-speed and a slower second type of memory. An example first type of memory can be Double Data Rate (DDR) Synchronous Dynamic Random-Access Memory (SDRAM) packaged with a CPU. Such first type of memory is sometimes referred to as "near memory" for being physically proximate to a CPU. Examples of the second type of memory can include those a CPU can interface with via Compute Express Link (CXL) or other suitable protocols. Such second type of memory can sometimes be referred to as "far memory" due to being at farther distances from the CPU than the near memory.

Using high-speed memory as near memory for a CPU can have certain drawbacks. For example, DDR SDRAM are typically more expensive than those used for far memory. The near memory is also not available to be accessed by or even visible to an Operating System (OS) on a computing device. Instead, the CPU has exclusive control over the near memory. In some datacenter servers, costs of DDR SDRAM used as near memory can be up to about fifty percent of the total costs of the datacenter servers. Thus, if the near memory can be visible to and accessible by the OS, capital investments for the datacenter servers and associated costs for providing various computing services from the datacenter servers can be significantly reduced.

Several embodiments of the disclosed technology are directed to implementing memory multi-tiering according to which the near memory can be used as a swap buffer for far memory instead of being dedicated cache memory for a CPU in a computing device. As such, the CPU can continue caching data in the near memory while the near memory and the far memory are exposed to the OS as addressable and allocatable system memory. In certain implementations, a hardware memory controller (e.g., a DRAM controller) can be configured to manage swapping operations at a cacheline granularity (e.g., 64 bytes). As such, the computing device would not need any software intervention or cause software impact. In other implementations, a memory controller with both hardware and software components may be used for controlling such swapping operations.

In certain implementations, the near memory can have the same or even more units of storage space than the far memory. For instance, a range of system memory addresses can be covered by a combination of near memory and far memory in a ratio of two to one, two to two, three to one, three to two, four to one, four to three, or other suitable ratios of integers greater than or equal to one. In one illustrative example, a range of system memory addresses (e.g., 512 GB) can be covered by a combination of near memory and far memory in a ratio of two to two, i.e., two 128 GB of near memory and two 128 GB of far memory. As such, a range of system memory can be divided into four sections, e.g., A, B, C, and D each corresponding to one section of storage space in the near or far memory.

In certain embodiments, multiple sections of near memory can be configured as individual look-through tiers when using the near memory as a swap buffer for the far memory. For instance, a first section of the near memory can be configured as Tier 1 while a second section 151B of the near memory is configured as a Tier 2. The far memory can be configured as Tier 3, which may include one or more additional sections. As such, during operation, when performing a read of data such as a cacheline, a memory controller can be configured to initially determine whether Tier 1 of the near memory contains the cacheline. When Tier 1 contains the cacheline, the memory controller retrieves the cacheline from Tier 1; provides the cacheline to a requesting entity; and terminates the read operation. When Tier 1 does not contain the cacheline, the memory controller can determine whether Tier 2 contains the cacheline. Such operations can be repeated in a recursive manner for additional tiers in the near memory. In other embodiments, the multiple sections can be configured in other suitable operational manners.

In certain embodiments, each section in the near or far memory can include a data portion (e.g., 512 bits) and a metadata portion (e.g., 128 bits). The data portion can be configured to contain data representing user data or instructions executable by the CPU in the computing device. The metadata portion can include metadata representing various attributes of the data in the data portion. For instance, the metadata portion can include Error Checking and Correction (ECC) bits encoding error tracking or other suitable types of information. In other embodiments, each section can also include additional and/or different data/metadata portions.

In accordance with several embodiments of the disclosed technology, several bits (e.g., ECC bits) in the metadata portion in Tier 1 of the near memory can be configured to indicate (1) which section of the range of system memory Tier 1 of the near memory current holds; and (2) locations of additional sections of the range of system memory in the other tiers of the near memory or far memory. For instance, in the example above with four sections of system memory having a near/far memory ratio of two to two, eight bits in the metadata portion of Tier 1 can be configured to contain such information. For example, a first pair of bits (Bit 1 and Bit 2) can be configured to indicate which section is currently held in Tier 1 the near memory as follows:

| Bit 1 | Bit 2 | Section ID |
|---|---|---|
| 0 | 0 | A |
| 0 | 1 | B |
| 1 | 0 | C |
| 1 | 1 | D |

As such, a memory controller can readily determine that Tier 1 of the near memory contains data from section A of the system memory when Bit 1 and Bit 2 contains zero and zero, respectively.

In the example above, while the first two bits correspond to Tier 1 of the near memory, the additional six bits can be subdivided into three pairs individually corresponding to Tier 2 of the near memory and first and second locations in the far memory mapped to corresponding sections of the range of system memory. For instance, the second, third, and fourth pairs can each correspond to a Tier 2 of the near memory, first location in the far memory, and second location in the far memory, respectively, as follows:

| First pair (Bit 1 and Bit 2) | Near memory Tier 1 |
| Second pair (Bit 3 and Bit 4) | Near memory Tier 2 |
| Third pair (Bit 5 and Bit 6) | First location in far memory |
| Fourth pair (Bit 7 and Bit 8) | Second location in far memory |

As such, the memory controller can readily determine a location for a section of the system memory even though the data of the section is not currently in Tier 1 of the near memory. For instance, when the second pair (i.e., Bit 3 and Bit 4) contains (0, 0), the memory controller can be configured to determine that data corresponding to section A of the system memory is in Tier 2 of the near memory.

Using the metadata from the metadata portion in Tier 1 of the near memory, the memory controller can be configured to manage swap operations between various tiers in the near and far memory when using the near memory as a swap buffer. For instance, during a read for a target section, the memory controller can be configured to read from Tier 1 of the near memory to retrieve data and metadata from both the data portion and the metadata portion from Tier 1 of the near memory. Based on the retrieved metadata, the memory controller can then be configured to determine which section of the system memory the retrieved data corresponds to using, for example, the tables above, and to determine whether the determined section matches the target section to be read. For instance, when the target section is section A, and the first two bits from the metadata portion contains (0, 0), then the memory controller can be configured to determine that the retrieved data from Tier 1 of the near memory corresponds to section A (referred to as "A data"). Thus, the memory controller can forward the retrieved data from section A to a requesting entity, such as an application or OS executed on the computing device.

On the other hand, when the first two bits from the metadata portion contains (0, 1) instead of (0, 0), for example, the memory controller can be configured to determine that the retrieved data belongs to section B (referred to as "B data"), not section A. The memory controller can then continue to examine the additional bits in the metadata portion to determine which pair of bits contains (0, 0). For example, when the second pair (Bit 3 and Bit 4) from the metadata portion contains (0, 0), then the memory controller can be configured to determine that A data is located at Tier 2 in the near memory. In response, the memory controller can be configured to read A data from Tier 2 in the near memory and provide the A data to the requesting entity. The memory controller can also be configured to write the retrieved A data into Tier 1 of the near memory and the previously retrieved B data from Tier 1 to Tier 2 in the near memory, and thus swapping the data in Tier 1 and Tier 2. The memory controller can also be configured to modify the bits in the metadata portion in the Tier 1 of the near memory to reflect the swapping of data between in Tier 1 and Tier 2 of the near memory.

In certain implementations, the memory controller can be configured to perform data eviction from the multiple tiers in a hierarchical manner, e.g., T1→T2→T3. For instance, in the example above, when examining the additional bits in the metadata portion, the memory controller may determine that the third pair (Bit 5 and Bit 6) contains (0, 0). Thus, the memory controller can determine that data A is located at the first location in the far memory. In response, the memory controller can be configured to retrieve data A from the first location in the far memory and provide the retrieved data A to the requesting entity. The memory controller can also be configured to evict data currently stored at Tier 1 of the near memory (e.g., data B) to Tier 2 of the near memory and evict data currently stored at Tier 2 of the near memory (e.g., data C corresponding to section C) to the first location of the far memory. Thus, upon completion of the read operation, data A, B, C are located at Tier 1, Tier 2, and the first location of the far memory.

During a write operation, the memory controller can be configured to first read the data from the metadata portion in Tier 1 of the near memory. The memory controller can be configured to then determine data from which section of the system memory is currently held in Tier 1 of the near memory, and whether the determined section matches a target section to be written. For instance, when the target section for the write operation is section A, and the first two bits from the metadata portion contains (0, 0), then the memory controller can be configured to determine that A data is currently in Tier 1 of the near memory. In response, the memory controller can be configured to overwrite the data in the data portion of Tier 1 of the near memory and report a completion of the write operation.

On the other hand, when the first two bits from the metadata portion contains (0, 1), then the memory controller can be configured to determine that data B is currently in Tier 1 of the near memory. In response, the memory controller can be configured to refrain from writing to Tier 1 of the near memory and instead continue examining the additional bits of the metadata portion to determine which pair of bits contains (0, 0). For example, when the second pair (Bit 3 and Bit 4) from the metadata portion contains (0, 0), then the memory controller can be configured to determine that A data is currently located at Tier 2 of the near memory. In response, the memory controller can be configured to write to Tier 2 of the near memory instead of Tier 1 of the near memory. Upon completion, the memory controller can be configured to report a completion of the write operation.

Several embodiments of the disclosed technology can improve operations and performance of a computing device by allowing memory previously used as cache memory and invisible to an OS to be configured as system memory addressable by the OS. For instance, instead of using the near memory as dedicated cache memory for the CPU, the near memory can be used as allocatable system memory while continue to provide caching functionality to the CPU via the swapping operations described above. By increasing the amount of addressable system memory, computing or other suitable types of latency can be decreased in the computing device.

Several embodiments of the disclosed technology can also mitigate certain performance outliers associated with a directly mapped cache. In certain computing systems, when two cachelines are alternately accessed in the near memory, one of the two cachelines may be evicted from the near memory by evicting the other cacheline from the near memory to the far memory. Such swapping can reduce memory bandwidth and thus negatively impact system performance. By configuring the near memory in multiple tiers, such swapping can be between tiers internal to the near memory, e.g., between Tier 1 and Tier 2 in the foregoing example. As such, memory bandwidth impact of such swapping can be significantly less than swapping between the near memory and far memory. In addition, configuring the near memory in multiple tiers also allow the computing system to be provisioned with more capacity in the near memory than the far memory.

DETAILED DESCRIPTION

Figure 1:
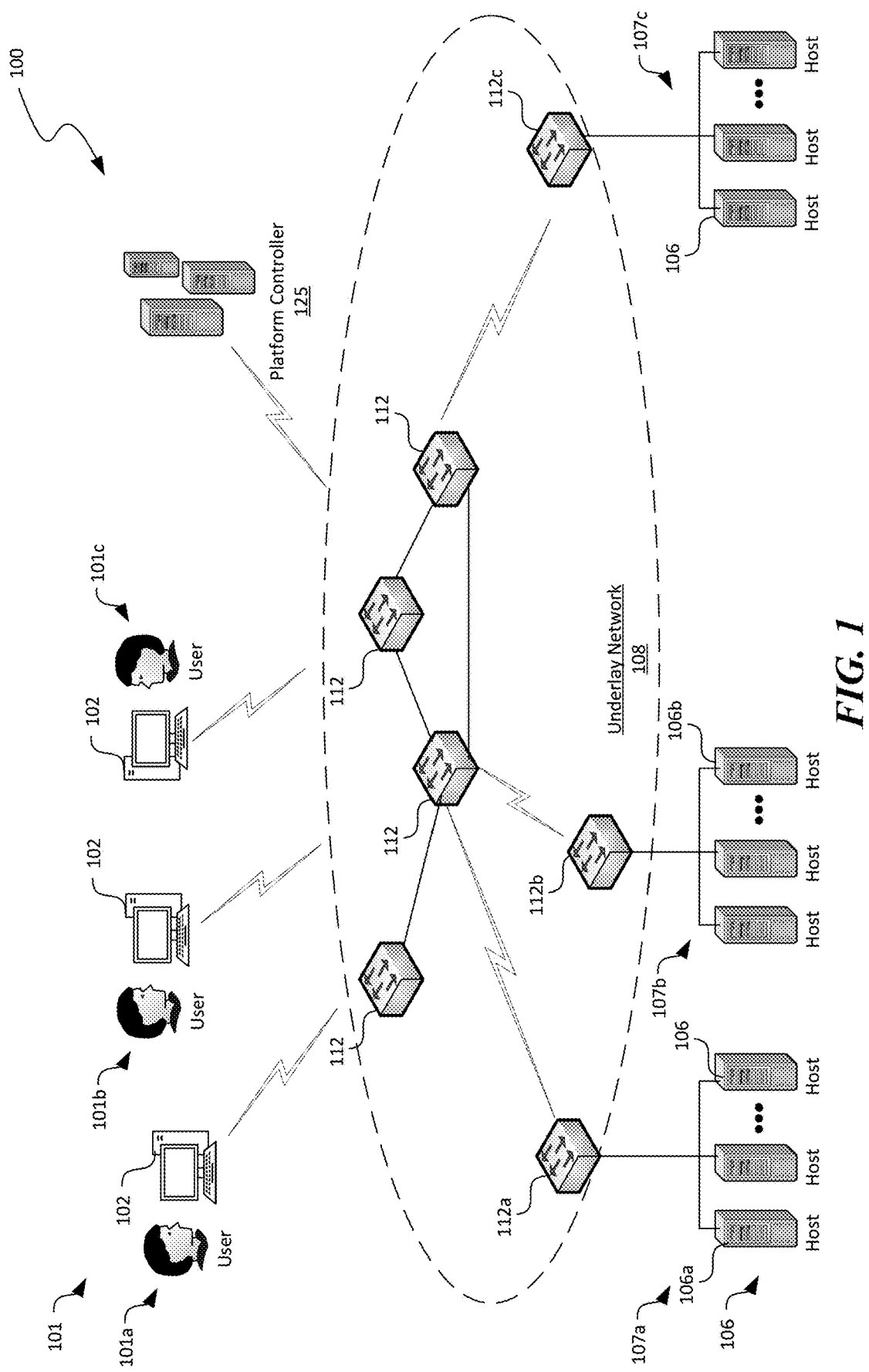
FIG. 1 is a schematic diagram illustrating a distributed computing system implementing memory operations management in accordance with embodiments of the disclosed technology.

Certain embodiments of systems, devices, components, modules, routines, data structures, and processes for memory tiering techniques are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6. For example, instead of being implemented in datacenters or other suitable distributed computing systems, aspects of the memory operations management technique disclosed herein can also be implemented on personal computers, smartphones, tablets, or other suitable types of computing devices.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network. In other implementations, a computer network can only include the underlay network.

Also used herein, the term "near memory" generally refers to memory that is physically proximate to a processor (e.g., a CPU) than other "far memory" at a distance from the processor. For example, near memory can include one or more DDR SDRAM dies that is incorporated into an Integrated Circuit (IC) component package with one or more CPU dies via an interposer and/or through silicon vias. In contrast, far memory can include additional memory on accelerators, memory buffers, or smart I/O devices that the CPU can interface with via CXL or other suitable types of protocols. For instance, in datacenters, multiple memory devices on multiple servers/server blades may be pooled to be allocatable to a single CPU on one of the servers/server blades. The CPU can access the allocated far memory via a computer network in datacenters.

FIG. 1 is a schematic diagram illustrating a distributed computing system 100 implementing memory operations management in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. The platform controller 125 can be a cluster controller, a fabric controller, a database controller, and/or other suitable types of controllers configured to monitor and manage resources and operations of the servers 106 and/or other components in the distributed computing system 100. Even though components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions.

For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topologies. The underlay network 108 can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

Figure 2:
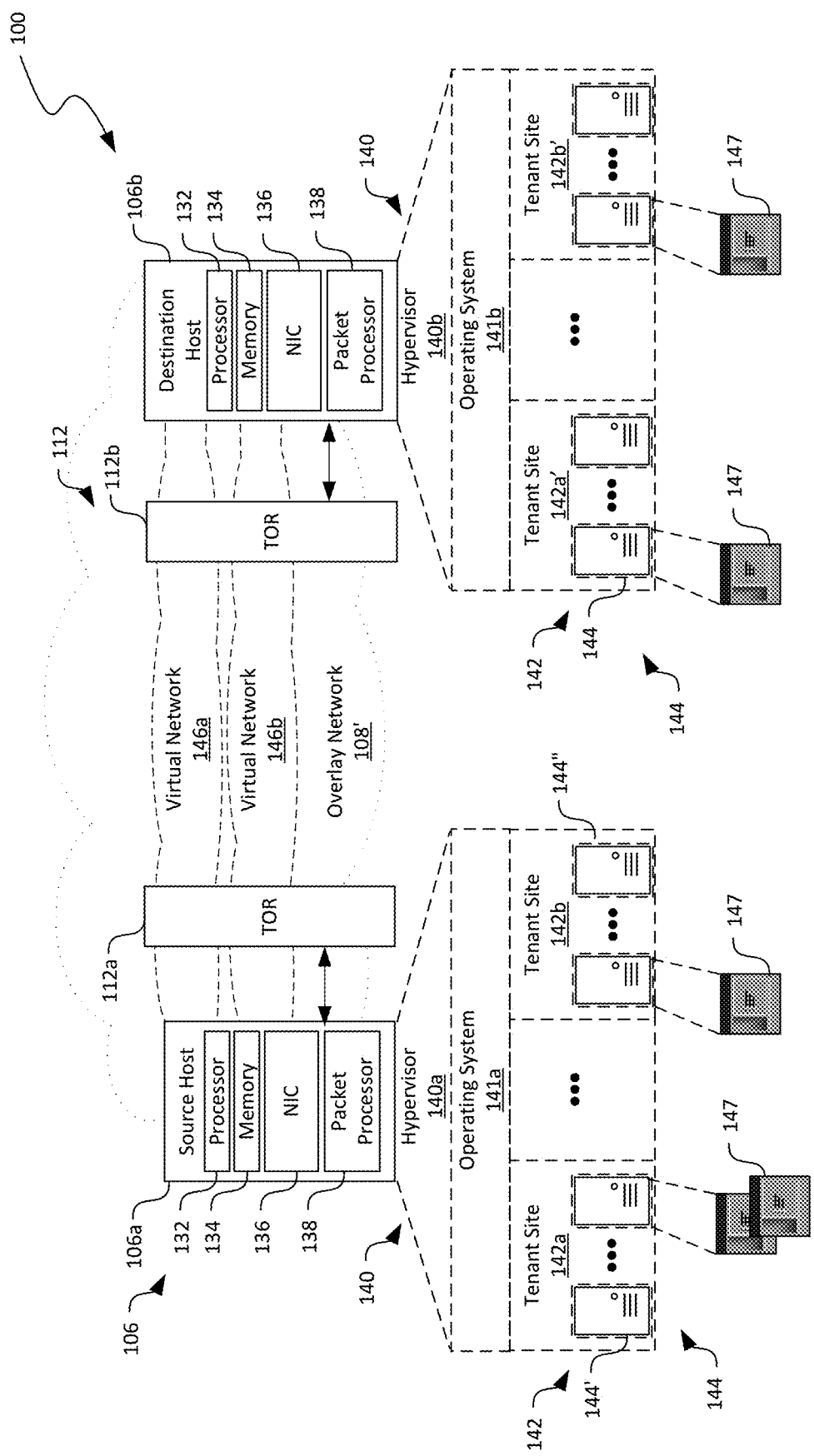
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the source host 106a and the destination hosts 106b and 106b' (only the destination hosts 106b is shown with detail components) can each include a processor 132, a memory 134, a network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5D). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The source host 106a and the destination host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisors 140 can individually be configured to generate, monitor, terminate, and/or otherwise manage one or more virtual machines 144 organized into tenant sites 142. For example, as shown in FIG. 2, the source host 106a can provide a first hypervisor 140a that manages first and second tenant sites 142a and 142b, respectively. The destination host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the source host 106a and the destination host 106b can both host the tenant site 142a and 142a' for a first tenant 101a (FIG. 1). The source host 106a and the destination host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the source host 106a and the destination host 106b. A second virtual network 146b interconnects the second tenant sites 142b and 142b' at the source host 106a and the destination host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). For example, the source host 106a can execute an application 147 that is configured to provide a computing service that monitors online trading and distribute price data to multiple users 101 subscribing to the computing service. The virtual machines 144 on the virtual networks 146 can also communicate with one another via the underlay network 108 (FIG. 1) even though the virtual machines 144 are located on different hosts 106.

Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, virtual switches (not shown) can be configured to switch or filter packets directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected to and/or integrated with the NIC 136 to facilitate network traffic operations for enforcing communications security, performing network virtualization, translating network addresses, maintaining/limiting a communication flow state, or performing other suitable functions. In certain implementations, the packet processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user 101 can configure logic blocks in FPGAs to perform complex combinational functions, or merely simple logic operations to synthetize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry.

In operation, the processor 132 and/or a user 101 (FIG. 1) can configure logic circuits in the packet processor 138 to perform complex combinational functions or simple logic operations to synthetize equivalent functionality executable in hardware at much faster speeds than in software. For example, the packet processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the application 147, the virtual machine 144, and/or other suitable software components on the source host 106a can generate an outbound packet destined to, for instance, other applications 147 at the destination hosts 106b and 106b'. The NIC 136 at the source host 106a can forward the generated packet to the packet processor 138 for processing according to certain policies in a flow table. Once processed, the packet processor 138 can forward the outbound packet to the first TOR 112a, which in turn forwards the packet to the second TOR 112b via the overlay/underlay network 108 and 108'.

The second TOR 112b can then forward the packet to the packet processor 138 at the destination hosts 106b and 106b' to be processed according to other policies in another flow table at the destination hosts 106b and 106b'. If the packet processor 138 cannot identify a packet as belonging to any flow, the packet processor 138 can forward the packet to the processor 132 via the NIC 136 for exception processing. In another example, when the first TOR 112a receives an inbound packet, for instance, from the destination host 106b via the second TOR 112b, the first TOR 112a can forward the packet to the packet processor 138 to be processed according to a policy associated with a flow of the packet.

The packet processor 138 can then forward the processed packet to the NIC 136 to be forwarded to, for instance, the application 147 or the virtual machine 144.

In certain embodiments, the memory 134 can include high speed memory and slower speed memory. High speed memory can act as a buffer between the slower speed memory and the processor 132 to hold frequently used data and instructions for immediate availability to the processor 132. For example, certain computers can include Double Data Rate (DDR) Synchronous Dynamic Random-Access Memory (SDRAM) packaged with a processor 132 as cache memory for the processor 132. Such cache memory is sometimes referred to as "near memory" for being proximate to the processor 132. In addition to the near memory, the processor 132 can also interface with the slower speed memory via Compute Express Link (CXL) or other suitable types of interface protocols. The slower speed memory can sometimes be referred to as "far memory" due to father distances from the processor 132 than the near memory.

The use of DDR SDRAM as cache memory for a processor 132 can have certain drawbacks. For example, the DDR SDRAM memory is typically more expensive than those used for the far memory and not available to be accessed by or even visible to an operating system (OS) on a computing device. Instead, the processor 132 has exclusive control over the near memory. In addition, near memory devices, such as DDR SDRAM, can be very expensive. In some datacenter servers, costs of DDR SDRAM as near memory can be up to about fifty percent of the total costs of the servers. Thus, if the near memory can be visible to and accessible by the operating system 141, capital investments for the servers and associated costs for providing various computing services from the hosts 106 can be significantly reduced.

Several embodiments of the disclosed technology are directed to implementing memory tiering according to which near memory is used as a swap buffer for far memory instead of being used as dedicated cache memory for the processor 132. As such, the processor 132 can continue caching data in the near memory while the near memory and the far memory are exposed to the operating system 141 as addressable system memory. In certain implementations, a hardware memory controller (not shown) can be configured to control swapping operations at a cache-line granularity (e.g., 64 bytes). As such, the host 106 would not experience any software intervention or impact. In other implementations, a memory controller with both hardware and software components may be used for controlling such swapping operations.

A ratio of storage space between near memory and far memory can be flexible. For instance, a range of system memory addresses can be covered by a combination of near memory and far memory in a ratio of two to one, two to two, three to one, three to two, four to one, four to three, or other suitable ratios of integers greater than or equal to one. In an illustrative example shown in FIG. 3A, a range of system memory address 150 is covered by a combination of near memory 151 and far memory 153 in a ratio of two to two. As such, the range of system memory 150 can be divided into four sections 152, e.g., A, B, C, and D. Each section can include a data portion 156 (e.g., 512 bits) and a metadata portion 154 (e.g., 128 bits). The data portion 156 can be configured to contain data representing user data or instructions executed in the host 106 (FIG. 2). The metadata portion 154 can include data representing various attributes of the data in the data portion 156. For instance, the metadata portion 154 can include error checking (ECC) and correction bits or other suitable types of information.

In certain embodiments, multiple sections of near memory can be configured as individual look-through tiers when using the near memory 151 as a swap buffer for the far memory 153. For instance, a first section 151A of the near memory 151 can be configured as Tier 1 while a second section 151B of the near memory is configured as a Tier 2. The far memory can be configured as Tier 3, which may include one or more additional sections, such as first memory location 158a and second memory location 158b. As such, during operation, when performing a read of data such as a cacheline, a memory controller 135 can be configured to initially determine whether Tier 1 of the near memory 151 contains the cacheline. When Tier 1 contains the cacheline, the memory controller 135 retrieves the cacheline from Tier 1; provides the cacheline to a requesting entity; and terminates the read operation. When Tier 1 does not contain the cacheline, the memory controller 135 can determine whether Tier 2 contains the cacheline. Such operations can be repeated in a recursive manner for additional tiers in the near memory 151, as described in more detail below with reference to FIGS. 4A-5C. In other embodiments, the multiple sections can be configured in other suitable operational manners.

In accordance with several embodiments of the disclosed technology, several bits in the metadata portion 154 in Tier 1 of the near memory 151 can be configured to indicate (1) which section of the range of system memory Tier 1 of the near memory 151 current holds; and (2) locations of additional sections of the range of system memory in Tier 2 of the near memory or the far memory 153. In the example with four sections of system memory 150, eight bits in the metadata portion 154 in the near memory 151 can be configured to indicate the foregoing information. For instance, a first pair of first two bits can be configured to indicate which section 152 is currently held in Tier 1 of the near memory 151 as follows:

| Bit 1 | Bit 2 | Section ID |
|---|---|---|
| 0 | 0 | A |
| 0 | 1 | B |
| 1 | 0 | C |
| 1 | 1 | D |

Figure 3A:
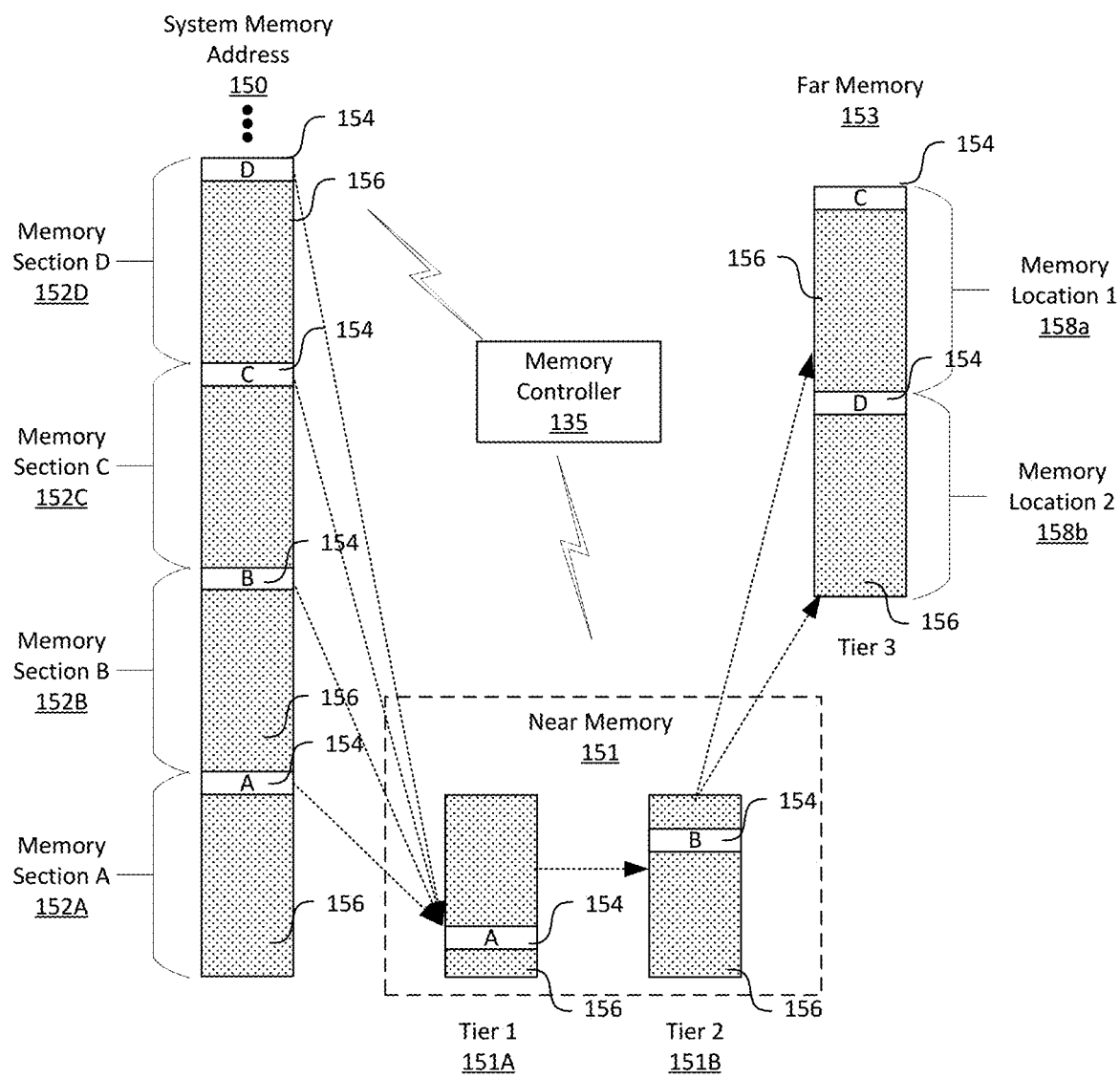
FIGS. 3A and 3B are schematic diagrams illustrating an example of tiering of system memory in accordance with embodiments of the disclosed technology.

As such, the memory controller 135 can readily determine that Tier 1 of the near memory 151 contains data from section A of the system memory when the Bit 1 and Bit 2 contains zero and zero, respective, as illustrated in FIG. 3A.

Figure 3B:
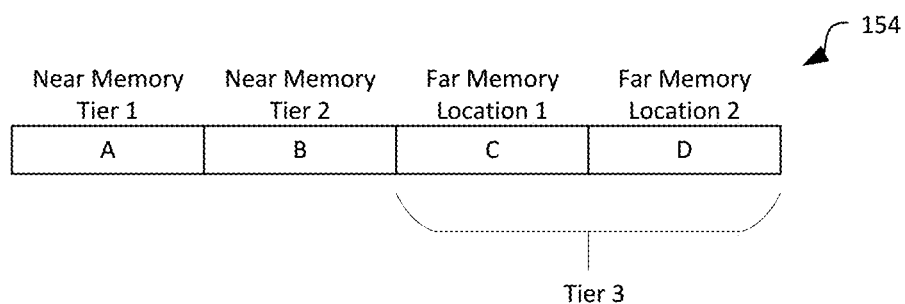

While the first two bits correspond to the near memory 151, the additional six bits can be subdivided into three pairs individually corresponding to Tier 2 of the near memory, a first location in the far memory 153, and a second location in the far memory 153, as illustrated in FIG. 3B. For instance, the second, third, and four pairs can each correspond to Tier 2, first, and second, locations in the far memory 153, as follows:

| | |
|---|---|
| First pair (Bit 1 and Bit 2) | Near memory Tier 1 |
| Second pair (Bit 3 and Bit 4) | Near memory Tier 2 |
| Third pair (Bit 5 and Bit 6) | First location in far memory |
| Fourth pair (Bit 7 and Bit 8) | Second location in far memory |

As such, the memory controller 135 can readily determine where data from a particular section of the system memory 150 is in Tier 2 of the near memory 151 or the far memory 153 even though the data is not currently in Tier 1 of the near memory 151. For instance, when the second pair (i.e., Bit 3 and Bit 4) contains (0, 1), the memory controller 135 can be configured to determine that data corresponding to Section B of the system memory 150 is in Tier 2 of the near memory 151. When the third pair (i.e., Bit 5 and Bit 6) contains (1, 1), the memory controller 135 can be configured to determine that data corresponding to Section D of the system memory 150 is in first location 158a in the far memory 153. When the fourth pair (i.e., Bit 7 and Bit 8) contains (1, 0), the memory controller 135 can be configured to determine that data corresponding to Section C of the system memory 150 is in second location 158b in the far memory 153, as illustrated in FIGS. 3A and 3B. Though the foregoing example uses eight bits in the metadata portion to encode locations of the individual sections of the range of system memory, in other implementations, other suitable numbers of bits in the metadata portion may be used to encode the same information. For instance, in the illustrated examples above with four sections, five, six, or seven bits may be used to encode location information of the sections.

Figure 4A:
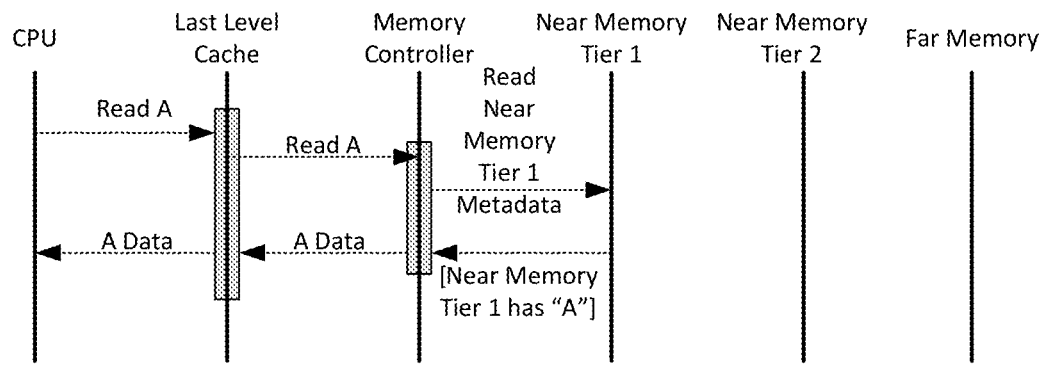
FIGS. 4A-4C are schematic timing diagrams illustrating example read operations of using near memory as a swap buffer in accordance with embodiments of the disclosed technology.

Using the data from the metadata portion 154 in the near memory 151, the memory controller 135 can be configured to manage swap operations between tiers in the near memory 151 and the far memory 153 using Tier 1 of the near memory 151 as a swap buffer. For example, as shown in FIG. 4A, during a read operation, the CPU can issue a command to the memory controller 135 to read data corresponding to, for instance, section A when such data is not currently residing in a last level cache of the CPU. In response, the memory controller 135 can be configured to read from Tier 1 of the near memory 151 to retrieve data from both the data portion and the metadata portion of the near memory 151. The memory controller 135 can then be configured to determine which section of the system memory the retrieved data corresponds to based on the retrieved metadata using, for instance, the tables shown above, and whether the determined section matches a target section to be read. For instance, as shown in FIG. 4A, when the target section is section A, and the first two bits from the metadata portion in Tier 1 contains (0, 0), then the memory controller 135 can be configured to determine that the retrieved data is from section A (i.e., "A data"). Thus, the memory controller 135 can forward the retrieved A data for section A to a requesting entity, such as an application executed by the CPU on the computing device.

Figure 4B:
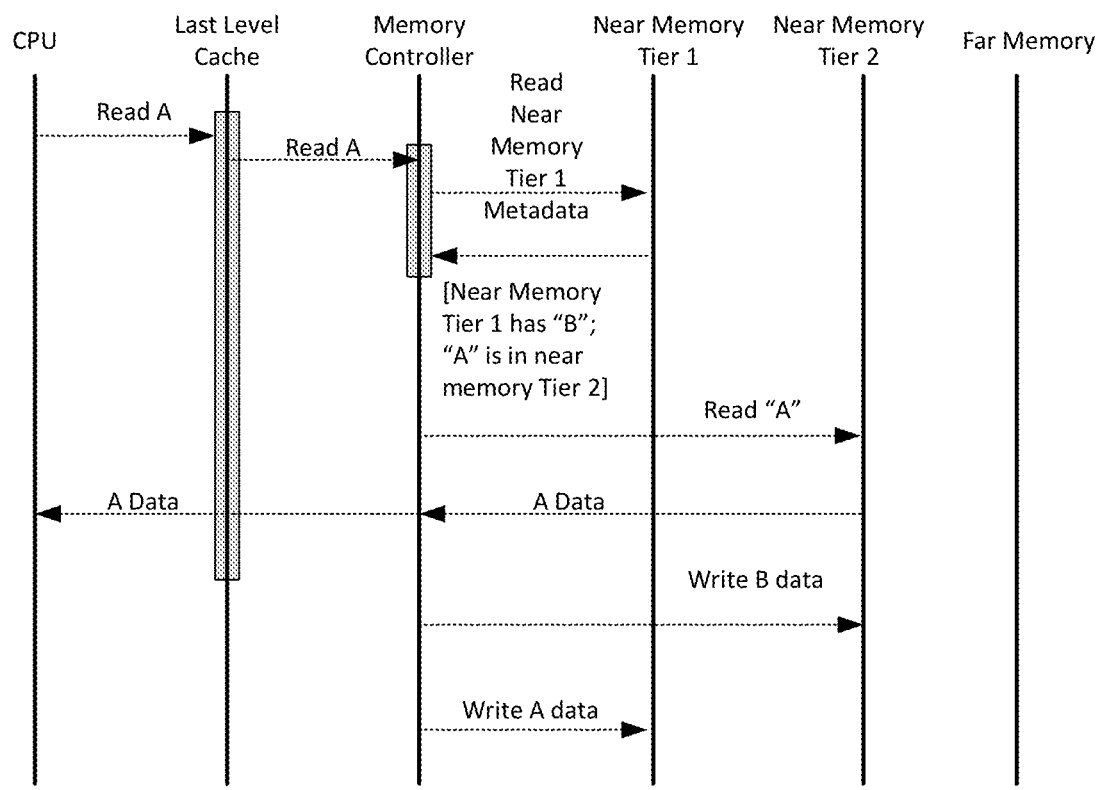
Figure 4C:
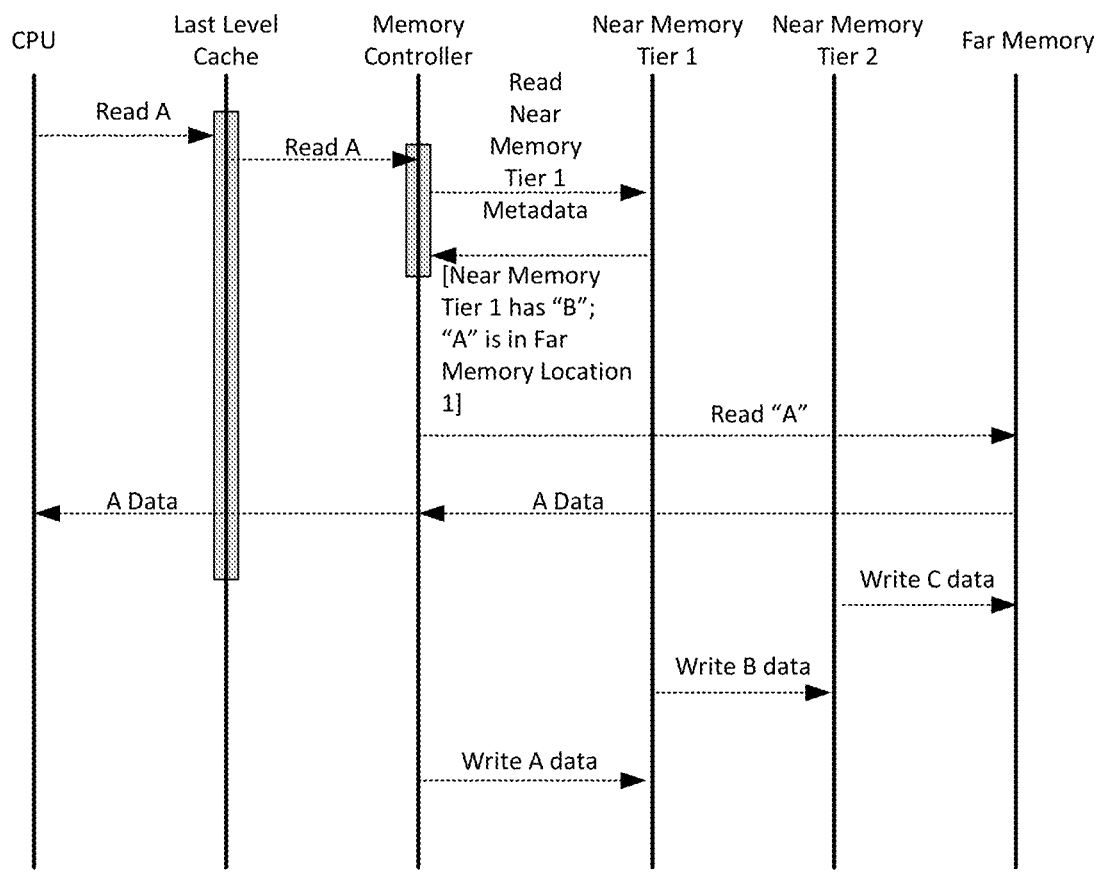

On the other hand, as shown in FIG. 4B, when the first two bits from the metadata portion contains (0, 1) instead of (0, 0), the memory controller 135 can be configured to determine that the retrieved data belongs to section B (i.e., "B data"), not A data. The memory controller 135 can then continue to examine the additional bits in the metadata portion to determine which pair of bits contains (0, 0). For example, when the second pair (Bit 3 and Bit 4) from the metadata portion contains (0, 0), then the memory controller 135 can be configured to determine that A data is located at Tier 2 in the near memory 151. In response, the memory controller 135 can be configured to read A data from the Tier 2 in the near memory 151 and provide the A data to the requesting entity. The memory controller 135 can then be configured to write the retrieved A data into Tier 1 of the near memory and the previously retrieved B data to Tier 2 of the near memory. The memory controller 135 can also be configured to modify the bits in the metadata portion in Tier 1 of the near memory to reflect the swapping between section A and section B in Tier 1 and Tier 2 of the near memory 151.

In another example, as shown in FIG. 4B, when the first two bits from the metadata portion contains (0, 1) instead of (0, 0), the memory controller 135 can be configured to determine that the retrieved data belongs to section B (i.e., "B data"), not A data. The memory controller 135 can continue to examine the additional bits in the metadata portion to determine, for example, the third pair (Bit 5 and Bit 6) from the metadata portion contains (0, 0), then the memory controller 135 can be configured to determine that A data is located at the first location 158a (FIG. 3A) in the far memory 153. In response, the memory controller 135 can be configured to read A data from the first location 158a in the far memory 153 and provide the A data to the requesting entity. The memory controller 135 can then be configured to write the retrieved A data into Tier 1 of the near memory; the previously retrieved B data to Tier 2 of the near memory; and evict data currently residing in Tier 2 (e.g., C data) to the first location 158a in the far memory 153. The memory controller 135 can also be configured to modify the bits in the metadata portion in Tier 1 of the near memory 151 to reflect the sequential data eviction from Tier 1 to Tier 2 of the near memory 151 and then to Tier 3 at the far memory 153.

Figure 5A:
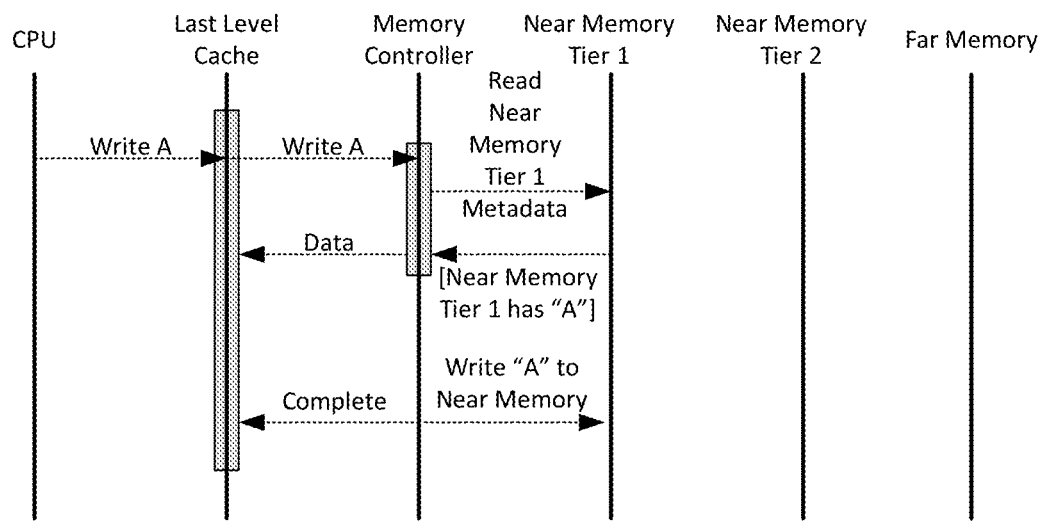
FIGS. 5A-5C are schematic timing diagrams illustrating example write operations of using near memory as a swap buffer in accordance with embodiments of the disclosed technology.

During a write operation, as shown in FIG. 5A, the memory controller 135 can be configured to first read the data from the metadata portion in Tier 1 of the near memory 151. The memory controller 135 can then determine data from which section of the system memory is currently held in Tier 1 of the near memory, and whether the determined section matches a target section to be written. For instance, when the target section is section A, and the first two bits from the metadata portion contains (0, 0), then the memory controller 135 can be configured to determine that A data is currently in Tier 1 of the near memory 151. Thus, the memory controller 135 can overwrite the data in the data portion of Tier 1 of the near memory 151 and report a completion of the write operation.

Figure 5B:
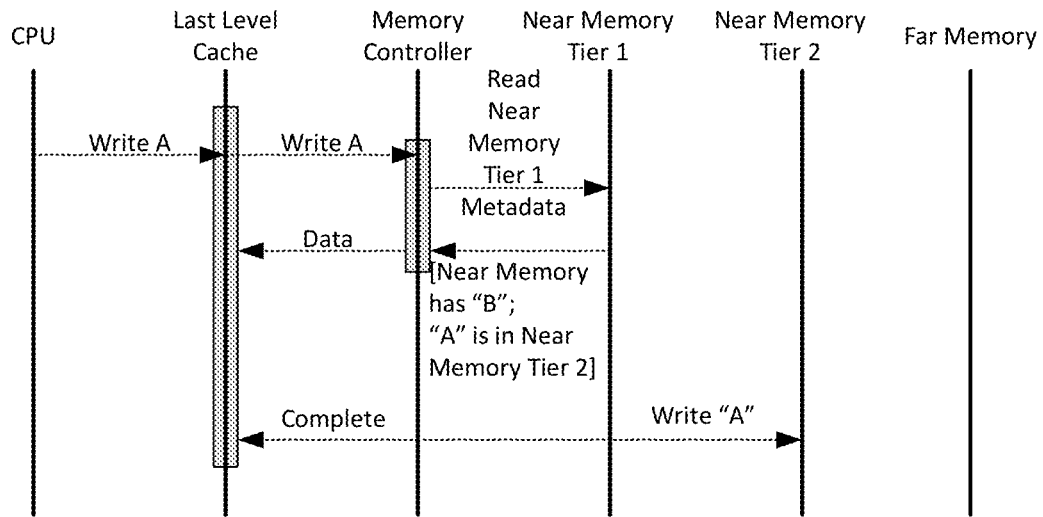

On the other hand, as shown in FIG. 5B, when the first two bits from the metadata portion contains (0, 1), then the memory controller 135 can be configured to determine that data B is currently in Tier 1 of the near memory 151. In response, the memory controller 135 can be configured to refrain from writing to Tier 1 of the near memory 151 and instead continue examining the additional bits of the metadata portion to determine which pair of bits contains (0, 0). For example, when the second pair (Bit 3 and Bit 4) from the metadata portion contains (0, 0), then the memory controller 135 can be configured to determine that A data is located at Tier 2 of the near memory 151. In response, the memory controller 135 can be configured to write to Tier 2 of the near memory 151 instead of Tier 1 of the near memory 151 and report a completion of the write operation.

Figure 5C:
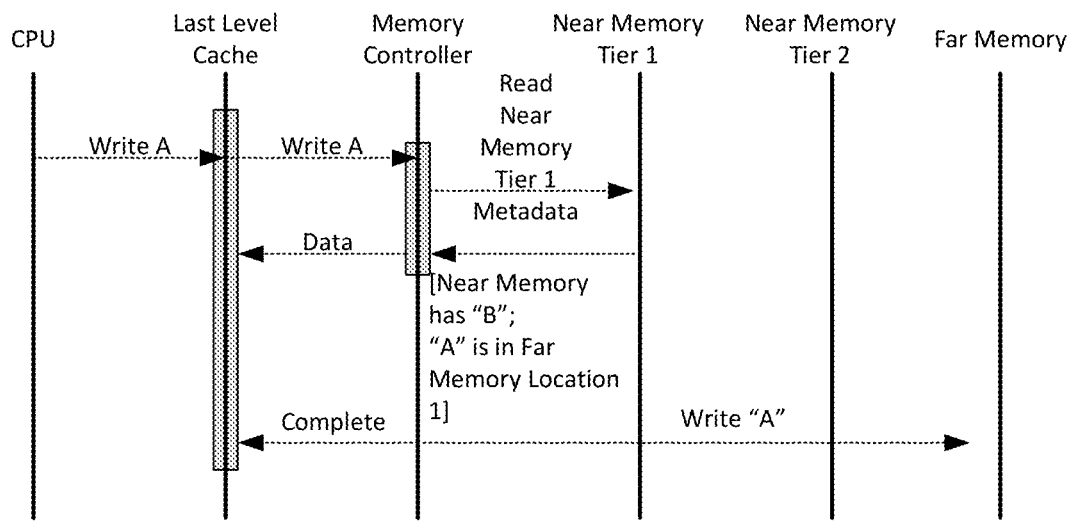

In another example, as shown in FIG. 5C, when the first two bits from the metadata portion contains (0, 1), then the memory controller 135 can be configured to determine that data B is currently in Tier 1 of the near memory 151. In response, the memory controller 135 can be configured to refrain from writing to Tier 1 of the near memory 151 and instead continue examining the additional bits of the metadata portion to determine which pair of bits contains (0, 0). For example, when the third pair (Bit 5 and Bit 6) from the metadata portion contains (0, 0), then the memory controller 135 can be configured to determine that A data is located at the first location 158a in the far memory 153. In response, the memory controller 135 can be configured to write to the first location 158*a* in the far memory 153 instead of Tier 1 of the near memory 151 and report a completion of the write operation.

Several embodiments of the disclosed technology can improve operations and performance of a computing device by allowing memory previously used as cache memory and invisible to an OS to be configured as system memory addressable by the OS. For instance, instead of using the near memory 151 as dedicated cache memory for the CPU, the near memory 151 can be used as allocatable system memory while continue to provide caching functionality to the CPU via the swapping and sequential eviction operations described above. By increasing the amount of addressable system memory, computing or other suitable types of latency can be decreased in the computing device.

Several embodiments of the disclosed technology can also reduce execution latency related to swapping operations between Tier 1 and Tier 2 by configuring multiple sections of the near memory 151 as individual tiers. It is believed that the memory controller 135 can be configured to perform swapping operations between Tier 1 and Tier 2 at very high speeds (e.g., less than or equal to 40 nanoseconds). As such, though the near memory 151 is configured to operate as a swap buffer instead of a dedicated cache, the additional swapping operations can have small or even negligible effect on execution latency. Though only Tier 1 and Tier 2 are shown in FIGS. 3A-5C to illustrate various aspects of the disclosed technology, in other embodiments, the near memory 151 can be configured to include three, four, five, or any other suitable number of tiers.

Figure 6:
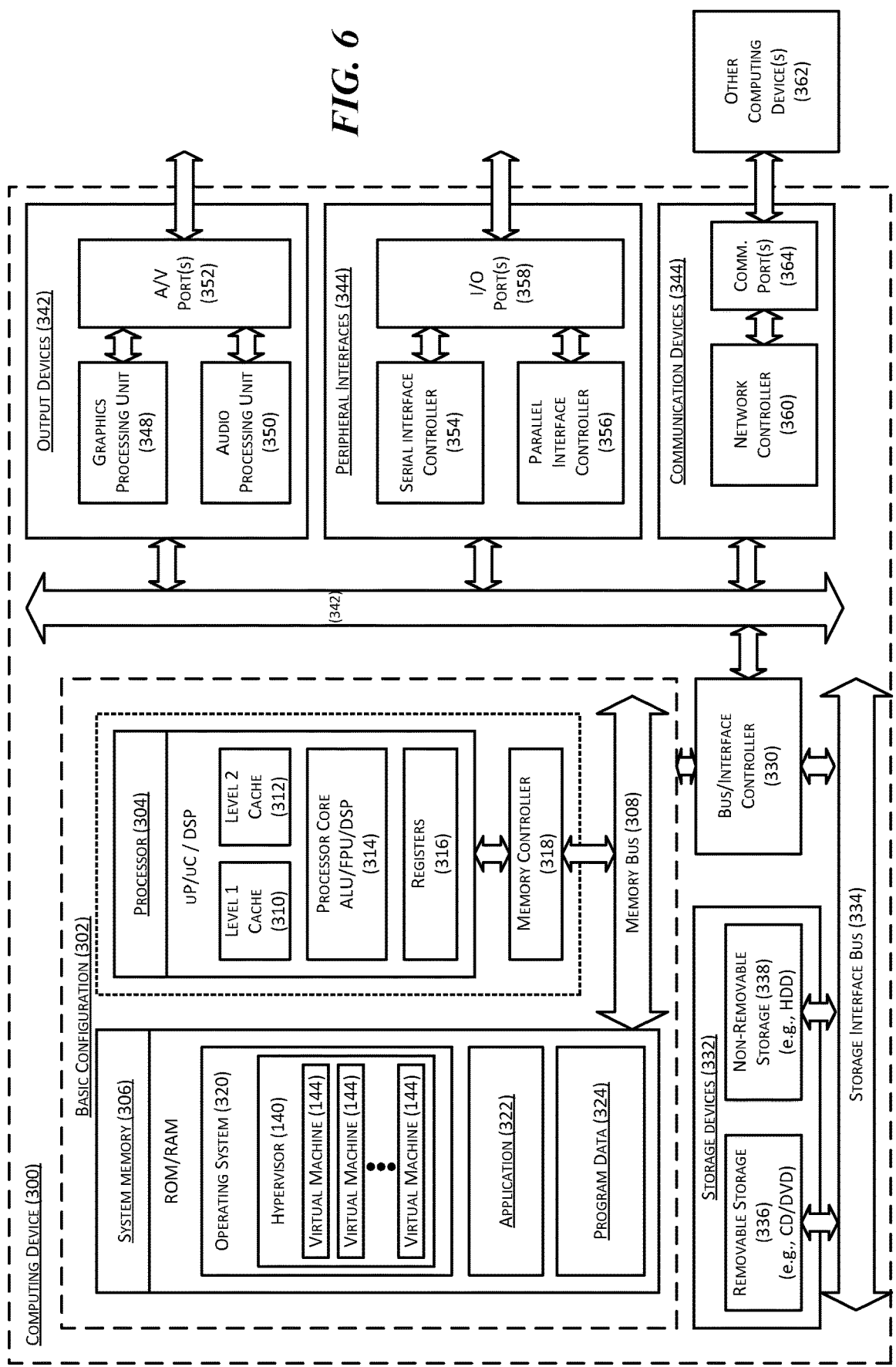
FIG. 6 is a computing device suitable for certain components of the distributed computing system in FIG. 1.

FIG. 6 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of memory management in a computing device having a processor, a first memory proximate to and configured as a cache for the processor, a second memory separate from and interfaced with the processor, and a memory controller configured to manage operations of the first and second memory, the method comprising:
   receiving, at the memory controller, a request from the processor to read data corresponding to a system memory section from the cache of the processor; and
   in response to receiving the request to read, with the memory controller,
      retrieving, from a first section in the first memory, data from a data portion and metadata from a metadata portion in the first section of the first memory, the metadata from the metadata portion encoding data location information of multiple system memory sections in the first section of the first memory, a second section of the first memory, and one or more additional sections in the second memory;
      analyzing the data location information in the retrieved metadata from the metadata portion of the first section in the first memory to determine whether the first section in the first memory currently contains data corresponding to the system memory section in the received request; and
      in response to determining that the first section in the first memory currently contains data corresponding to the system memory section in the received request, transmitting the retrieved data from the data portion of the first section in the first memory to the processor in response to the received request.

2. The method of claim 1, further comprising:
   in response to determining that the first section in the first memory currently does not contain data corresponding to the system memory section in the received request,
      further analyzing the data location information in the retrieved metadata to identify whether the second section in the first memory or a memory location in the second memory contains data corresponding to the system memory section in the received request; and
      retrieving the data from the second section in the first memory or the memory location in the second memory and providing the retrieved data to the processor in response to the received request.

3. The method of claim 1, further comprising:
   in response to determining that the first section in the first memory currently does not contain data corresponding to the system memory section in the received request,
      further analyzing the data location information in the retrieved metadata to identify whether the second section in the first memory or a memory location in the second memory contains the data corresponding to the system memory section in the received request;
      upon determining that the second section in the first memory contains the data corresponding to the system memory section in the received request,
         retrieving the data from the second section in the first memory and providing the retrieved data to the processor in response to the received request; and
         writing, to the first section in the first memory, the retrieved data from the second section in the first memory.

4. The method of claim 1, further comprising:
   in response to determining that the first section in the first memory currently does not contain data corresponding to the system memory section in the received request,
      further analyzing the data location information in the retrieved metadata to identify whether the second section in the first memory or a memory location in the second memory contains the data corresponding to the system memory section in the received request;
      upon determining that the second section in the first memory contains the data corresponding to the system memory section in the received request,
         retrieving the data from the second section in the first memory and providing the retrieved data to the processor in response to the received request;
      writing, to the first section in the first memory, the retrieved data from the second section in the first memory; and
      modifying the metadata in the metadata portion of the first memory to indicate that the data corresponding to the system memory section in the received request is now in the first section of the first memory.

5. The method of claim 1, further comprising:
   in response to determining that the first section in the first memory currently does not contain data corresponding to the system memory section in the received request,
      further analyzing the data location information in the retrieved metadata to identify whether the second section in the first memory or a memory location in the second memory contains the data corresponding to the system memory section in the received request;
      upon determining that the second section in the first memory contains the data corresponding to the system memory section in the received request,
         retrieving the data from the second section in the first memory and providing the retrieved data to the processor in response to the received request;
      writing, to the first section in the first memory, the retrieved data from the second section in the first memory; and
      writing, to the second section in the first memory, the retrieved data from the first section of the first memory.

6. The method of claim 1, further comprising:
   in response to determining that the first section in the first memory currently does not contain data corresponding to the system memory section in the received request,
      further analyzing the data location information in the retrieved metadata to identify whether the second section in the first memory or a memory location in the second memory contains the data corresponding to the system memory section in the received request;

upon determining that the second section in the first memory contains the data corresponding to the system memory section in the received request,
retrieving the data from the second section in the first memory and providing the retrieved data to the processor in response to the received request;

writing, to the first section in the first memory, the retrieved data from the second section in the first memory;

writing, to the second section in the first memory, the retrieved data from the first section of the first memory; and modifying the metadata in the metadata portion in the first section of the first memory to indicate that:
the data corresponding to the system memory section in the received request is now in the first section of the first memory; and
the data previously held in the first section of the first memory is now in the second section of the first memory.

7. The method of claim 1 wherein:
the metadata from the metadata portion includes one or more bits; and
the data location information includes combinations of the one or more bits that individually correspond to one of the multiple system memory sections; and
analyzing the data location information includes:
identifying a combination of the one or more bits; and
determining whether the identified combination corresponds to the system memory section in the received request.

8. The method of claim 1 wherein:
the metadata from the metadata portion includes one or more Error Checking and Correction (ECC) bits; and
the data location information includes combinations of the one or more ECC bits that individually correspond to one of the multiple system memory sections; and
analyzing the data location information includes:
identifying a combination of the one or more ECC bits; and
determining whether the identified combination of ECC bits corresponds to the system memory section in the received request.

9. A computing device, comprising:
a processor;
a first memory proximate to and configured as a cache for the processor;
a second memory separate from and interfaced with the processor; and
a memory controller configured to manage operations of the first and second memory, wherein the memory controller having instructions executable by the memory controller to:
upon receiving a request from the processor to read data corresponding to a system memory section from the cache of the processor,
retrieve, from a first section of the first memory, data from a data portion and metadata from a metadata portion of the first section of the first memory, the metadata from the metadata portion encoding data location information of multiple system memory sections in the first section of the first memory, a second section of the first memory, and one or more additional sections of the second memory;
analyze the data location information in the retrieved metadata from the metadata portion of the first section in the first memory to determine whether the first section in the first memory currently contains data corresponding to the system memory section in the received request; and in response to determining that the first section in the first memory currently contains data corresponding to the system memory section in the received request, transmit the retrieved data from the data portion of the first section in the first memory to the processor in response to the received request.

10. The computing device of claim 9 wherein the memory controller includes additional instructions executable to:
in response to determining that the first section in the first memory currently does not contain data corresponding to the system memory section in the received request, further analyze the data location information in the retrieved metadata to identify whether the second section in the first memory or a memory location in the second memory contains data corresponding to the system memory section in the received request; and
retrieve the data from the second section in the first memory or the memory location in the second memory and providing the retrieved data to the processor in response to the received request.

11. The computing device of claim 9 wherein the memory controller includes additional instructions executable to:
in response to determining that the first section in the first memory currently does not contain data corresponding to the system memory section in the received request, further analyze the data location information in the retrieved metadata to identify whether the second section in the first memory or a memory location in the second memory contains the data corresponding to the system memory section in the received request;
upon determining that the second section in the first memory contains the data corresponding to the system memory section in the received request,
retrieve the data from the second section in the first memory and providing the retrieved data to the processor in response to the received request; and
write, to the first section in the first memory, the retrieved data from the second section in the first memory.

12. The computing device of claim 9 wherein the memory controller includes additional instructions executable to:
in response to determining that the first section in the first memory currently does not contain data corresponding to the system memory section in the received request, further analyze the data location information in the retrieved metadata to identify whether the second section in the first memory or a memory location in the second memory contains the data corresponding to the system memory section in the received request;
write, to the first section in the first memory, the retrieved data from the second section in the first memory; and
modify the metadata in the metadata portion of the first memory to indicate that the data corresponding to the system memory section in the received request is now in the first section of the first memory.

13. The computing device of claim 9 wherein the memory controller includes additional instructions executable to:

in response to determining that the first section in the first memory currently does not contain data corresponding to the system memory section in the received request, further analyze the data location information in the retrieved metadata to identify whether the second section in the first memory or a memory location in the second memory contains the data corresponding to the system memory section in the received request;

retrieve the data from the second section in the first memory and providing the retrieved data to the processor in response to the received request;

write, to the first section in the first memory, the retrieved data from the second section in the first memory; and write, to the second section in the first memory, the retrieved data from the first section of the first memory.

14. The computing device of claim 9 wherein the memory controller includes additional instructions executable to:

in response to determining that the first section in the first memory currently does not contain data corresponding to the system memory section in the received request, further analyze the data location information in the retrieved metadata to identify whether the second section in the first memory or a memory location in the second memory contains the data corresponding to the system memory section in the received request;

upon determining that the second section in the first memory contains the data corresponding to the system memory section in the received request, retrieve the data from the second section in the first memory and providing the retrieved data to the processor in response to the received request;

write, to the first section in the first memory, the retrieved data from the second section in the first memory;

write, to the second section in the first memory, the retrieved data from the first section of the first memory; and modify the metadata in the metadata portion in the first section of the first memory to indicate that the data corresponding to the system memory section in the received request is now in the first section of the first memory and the data previously held in the first section of the first memory is now in the second section of the first memory.

15. The computing device of claim 9 wherein:

the metadata from the metadata portion includes one or more bits; and the data location information includes combinations of the one or more bits that individually correspond to one of the multiple system memory sections; and to analyze the data location information includes:
identify a combination of the one or more bits; and
determine whether the identified combination corresponds to the system memory section in the received request.

16. A method of memory management in a computing device having a processor, a first memory proximate to and configured as a cache for the processor, a second memory separate from and interfaced with the processor, and a memory controller configured to manage operations of the first and second memory, the method comprising:

receiving, at the memory controller, a request from the processor to write a block of data corresponding to a system memory section to the cache of the processor; and in response to receiving the request to write the block of data, with the memory controller, retrieving, from a first section of the first memory, metadata from a metadata portion of the first section in the first memory, the metadata from the metadata portion encoding data location information of multiple system memory sections in the first section of the first memory, a second section of the first memory, and one or more additional sections in the second memory;

analyzing the data location information in the retrieved metadata from the metadata portion of the first section in the first memory to determine whether the first section in the first memory currently contains data corresponding to the system memory section in the received request; and in response to determining that the first section in the first memory currently contains data corresponding to the system memory section in the received request, writing the block of data corresponding to the system memory section to the first section in the first memory; and indicating, to the processor, a completion of writing the block of data.

17. The method of claim 16, further comprising:

in response to determining that the first section in the first memory currently does not contain data corresponding to the system memory section in the received request, further analyzing the data location information in the retrieved metadata to identify whether the second section in the first memory or a memory location in the second memory contains data corresponding to the system memory section in the received request; and writing the block of data to the second section in the first memory or the memory location in the second memory; and indicating, to the processor, a completion of writing the block of data.

18. The method of claim 16, further comprising:

in response to determining that the first section in the first memory currently does not contain data corresponding to the system memory section in the received request, further analyzing the data location information in the retrieved metadata to identify whether the second section in the first memory or a memory location in the second memory contains data corresponding to the system memory section in the received request;

maintaining data currently in the first section in the first memory;

writing the block of data to the second section in the first memory or the memory location in the second memory; and indicating, to the processor, a completion of writing the block of data.

19. The method of claim 17 wherein:

the metadata from the metadata portion includes one or more bits; and the data location information includes combinations of the one or more bits that individually correspond to one of the multiple system memory sections; and analyzing the data location information includes:
   identifying a combination of the one or more bits; and
   determining whether the identified combination corresponds to the system memory section in the received request.

20. The method of claim 17 wherein:
the metadata from the metadata portion includes one or more Error Checking and Correction (ECC) bits; and
the data location information includes combinations of the one or more ECC bits that individually correspond to one of the multiple system memory sections; and
analyzing the data location information includes:
   identifying a combination of the one or more ECC bits; and
   determining whether the identified combination of ECC bits corresponds to the system memory section in the received request.

\* \* \* \* \*